United States Patent
Palavalli et al.

(10) Patent No.: US 10,205,771 B2
(45) Date of Patent: Feb. 12, 2019

(54) SYSTEM AND METHOD FOR DEPLOYING AN APPLICATION IN A COMPUTER SYSTEM

(71) Applicant: VMWARE, INC., Palo Alto, CA (US)

(72) Inventors: Amarnath Palavalli, Bangalore (IN); Kumar Gaurav, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 486 days.

(21) Appl. No.: 14/842,841

(22) Filed: Sep. 2, 2015

(65) Prior Publication Data

US 2016/0381133 A1 Dec. 29, 2016

(30) Foreign Application Priority Data

Jun. 25, 2015 (IN) .......................... 3200/CHE/2015

(51) Int. Cl.
| | | |
|---|---|---|
| *H04L 29/08* | (2006.01) | |
| *G06F 9/455* | (2018.01) | |
| *H04L 12/24* | (2006.01) | |
| *G06F 8/61* | (2018.01) | |

(52) U.S. Cl.
CPC .......... *H04L 67/10* (2013.01); *G06F 9/45533* (2013.01); *G06F 9/45558* (2013.01); *H04L 41/5054* (2013.01); *H04L 41/5058* (2013.01); *H04L 67/34* (2013.01); *G06F 8/61* (2013.01); *G06F 2009/45562* (2013.01); *H04L 41/5096* (2013.01)

(58) Field of Classification Search
CPC ..... H04L 67/10; H04L 67/34; H04L 41/5054; H04L 41/5058; H04L 41/5096; G06F 9/45533; G06F 9/45558; G06F 8/61; G06F 2009/45562
See application file for complete search history.

(56) References Cited

U.S. PATENT DOCUMENTS

| | | | |
|---|---|---|---|
| 2011/0246992 A1* | 10/2011 | Kern .................. | G06F 9/485 718/100 |
| 2013/0097319 A1* | 4/2013 | Ahmad ................ | G06F 9/5033 709/226 |
| 2013/0097464 A1* | 4/2013 | Ahmad ............... | G06F 9/45558 714/47.1 |
| 2013/0232480 A1* | 9/2013 | Winterfeldt ............ | G06F 8/60 717/177 |
| 2014/0082614 A1* | 3/2014 | Klein .................. | G06F 9/45558 718/1 |
| 2014/0201737 A1* | 7/2014 | Mitkar ................ | G06F 9/461 718/1 |

(Continued)

*Primary Examiner* — Wing F Chan
*Assistant Examiner* — Billy H Ng
(74) *Attorney, Agent, or Firm* — Loza & Loza, LLP (57) ABSTRACT

System and method for deploying an application in a computer system automatically extend an application topology of virtual computing resources of the computer system and application components of the application to be executed on the virtual computing resources to include an affinity-type rule for the virtual computing resources of the computer system based on at least one predefined policy of the application topology and deploy the application in the computer system by provisioning the virtual computing resources to the physical devices in the computer system based on the extended application topology.

27 Claims, 5 Drawing Sheets

(56) References Cited

U.S. PATENT DOCUMENTS

| | | | | |
|---|---|---|---|---|
| 2015/0193245 A1* | 7/2015 | Cropper | .............. | G06F 9/45533 |
| | | | | 718/1 |
| 2016/0103698 A1* | 4/2016 | Yang | .................... | G06F 11/202 |
| | | | | 714/4.11 |
| 2016/0359668 A1* | 12/2016 | Udupi | ................. | G06F 9/45533 |
| 2017/0097845 A1* | 4/2017 | Kouznetsov | ........ | G06F 9/45558 |

\* cited by examiner

SYSTEM AND METHOD FOR DEPLOYING AN APPLICATION IN A COMPUTER SYSTEM

RELATED APPLICATIONS

Benefit is claimed under 35 U.S.C. 119(a)-(d) to Foreign application Serial No. 3200/CHE/2015 filed in India entitled "SYSTEM AND METHOD FOR DEPLOYING AN APPLICATION IN A COMPUTER SYSTEM", on Jun. 25, 2015, by VMware, Inc., which is herein incorporated in its entirety by reference for all purposes.

BACKGROUND

In a virtual datacenter, application services can be deployed based on application topologies/blueprints, which describe virtual computing resources and application components to he executed on the virtual computing resources. For example, an application topology/blueprint can describe one or more virtual machines (VMs) and software application components to be executed on the VMs. Virtual computing resources, such as VMs, defined in application topologies/blueprints are provisioned with custom parameters for computing power, storage and operating system.

In some conventional virtualized infrastructures, affinity-type rules are manually created by an administrator to specify the placement of virtual computer resources onto host computers. However, since there can be hundreds or even thousands of clients running in some virtualized infrastructures, manually creating affinity-type rules for some of these clients can be overwhelming. For example, if an application blueprint describes multiple database nodes that rely heavily on disk Input/Output (I/O), an administrator needs to manually place the database nodes on separate hosts. Similarly, to avoid network traffic bottlenecks, an administrator needs to manually place two firewall VMs on separate hosts.

SUMMARY

System and method for deploying an application in a computer system automatically extend an application topology of virtual computing resources of the computer system and application components of the application to be executed on the virtual computing resources to include an affinity-type rule for the virtual computing resources of the computer system based on at least one predefined policy of the application topology and deploy the application in the computer system by provisioning the virtual computing resources to the physical devices in the computer system based on the extended application topology.

A method of deploying an application in a computer system in accordance with an embodiment of the invention involves obtaining an application topology of virtual computing resources of the computer system and application components of the application to be executed on the virtual computing resources, automatically extending the application topology to include an affinity-type rule for the virtual computing resources of the computer system based on at least one predefined policy of the application topology, where the at least one predefined policy contains information describing how different functional types of the virtual computing resources of the computer system are to be placed onto physical devices in the computer system, and deploying the application in the computer system by provisioning the virtual computing resources to the physical devices in the computer system based on the extended application topology. In some embodiments, the steps of this method are performed when program instructions contained in a computer-readable storage medium are executed by one or more processors.

A system for deploying an application in a computer system in accordance with an embodiment of the invention includes an application topology generation unit configured to obtain an application topology of virtual computing resources of the computer system and application components of the application to be executed on the virtual computing resources, an application topology modification unit configured to automatically extend the application topology to include an affinity-type rule for the virtual computing resources of the computer system based on at least one predefined policy of the application topology, where the at least one predefined policy contains information describing how different functional types of the virtual computing resources of the computer system are to be placed onto physical devices in the computer system, and a virtual computing resource provision unit configured to deploy the application in the computer system by provisioning the virtual computing resources to the physical devices in the computer system based on the extended application topology.

Other aspects and advantages of embodiments of the present invention will become apparent from the following detailed description, taken in conjunction with the accompanying drawings illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
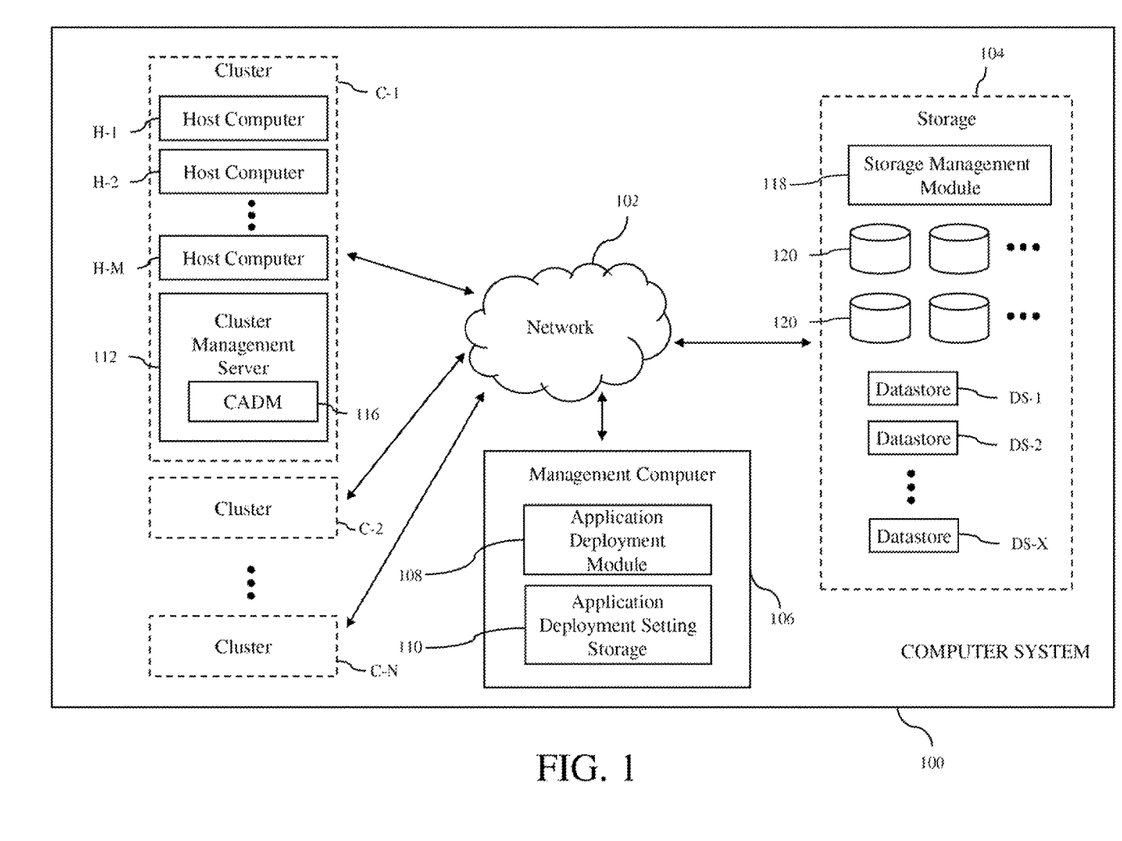
FIG. 1 is a block diagram of a computer system in accordance with an embodiment of the invention.

Turning now to FIG. 1, a computer system 100 in accordance with an embodiment of the invention is shown. The computer system may be, for example, a distributed computer network system. As shown in FIG. 1, the computer system includes a network 102, clusters C-1, C-2 . . . C-N (where N is a positive integer) of host computers, storage 104 and a management computer 106 with an application deployment module 108 and an application deployment setting storage 110. The clusters of host computers are used to support or host clients that can execute various applications. The exact number of host computer clusters included in the computer system can be any number of clusters from one to tens of clusters or more. The host computers of the different clusters may be connected to the storage and the management computer via the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 . . . C-N includes a number of host computers H-1, H-2 . . . H-M (where M is a positive integer) and a cluster management server 112. The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have a different number of host computers. The host computers are physical computer systems that host or support one or more clients so that the clients are executing on the physical computer systems. As used herein, the term "client" is any software entity that can run on a computer system, such as a software application, a software process, a virtual machine (VM) and a "container" that provides system-level process isolation. The host computers may be servers that are commonly found in datacenters. As an example, the host computers may he servers installed in one or more server racks. In an embodiment, the host computers of a cluster are located within the same server rack.

Figure 2:
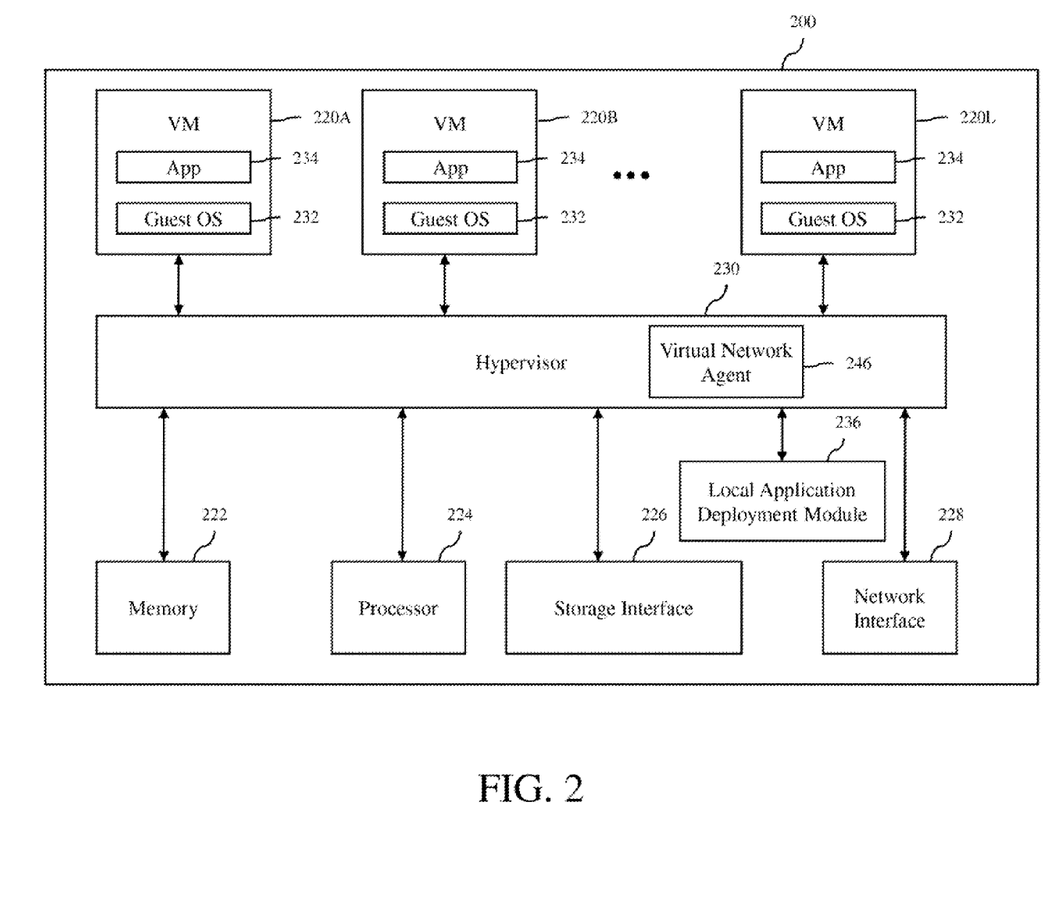
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2, . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs in this embodiment. The number of VMs supported by the host computer can be anywhere from one to more than one thousand. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor cm be any type of a processor, such as a central processing unit (CPU) commonly found in a server. The storage interface is an interface that allows that host computer to communicate with the storage 104. As an example, the storage interface may he a host bus adapter or a network the system interface. The network interface is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 232 and one or more guest applications (APP) 234. The guest operating system manages virtual system resources made available to the corresponding VM by the hypervisor 230, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 may also include a local application deployment module 236 that operates as part of an application deployment system to deploy application components of the application to be executed on the VMs 220A, 220B . . . 220L according to an application topology. The local application deployment module in each host computer can cooperatively operate with the local application deployment modules in the other host computers of the computer system 100. Although the local application deployment module is illustrated in FIG. 2 as being separate from the hypervisor 230, the local application deployment module may be implemented as part of the hypervisor. In some embodiments, the local application deployment module is implemented as software programs running on the host computer. However, in other embodiments, the local application deployment module may be implemented using any combination of software and hardware.

The host computer 200 may further include a virtual network agent 246, which operates within the hypervisor 230 to provide virtual networking capabilities, such as bridging, L3 routing, L2 switching and firewall capabilities, so that software defined networks or virtual networks can be created. In a particular embodiment, the virtual network agent may be part of a VMware NSX™ virtual network product installed in the computer system 100.

Turning back to FIG. 1, each of the cluster management servers 112 in the clusters C-1, C-2 . . . C-N operates to monitor and manage the host computers H-1, H-2 . . . H-M in the respective cluster. Each cluster management server may be configured to monitor the current configurations of the host computers and the clients, e.g., VMs, running on the host computers in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The "demand," or current usage, of the clients for the consumable resources, such as CPU, memory, network, and storage, are measured by the host computers hosting the clients and provided to the respective cluster management server. The cluster management servers may also perform various operations to manage the clients and the host computers H-1, H-2 . . . H-M in their respective clusters. In some embodiments, each cluster management server is configured to perform resource allocations and load balancing in the respective cluster. Each cluster management server may be configured to power down particular clients and/or host computers in the respective cluster to conserve power. Each cluster management server may further be configured or programmed to perform other operations to manage the respective cluster. In some embodiments, each cluster management server is also configured to perform storage resource management for the respective cluster.

The cluster management servers 112 perform various operations to deploy applications to the host computers H-1, H-2 . . . H-M in their respective clusters C-1, C-2 . . . C-N and the storage 104 according to the respective application topology. The application topology of an application, which is also referred to as the application blueprint or the application architecture of the application, contains information regarding virtual computing resources and application components of the application to be executed on the virtual computing resources. As illustrated in FIG. 1, in an embodiment, each cluster management server includes a cluster application deployment module (CADM) 116 configured to perform application deployment in the respective cluster. The CADM operates to deploy application components of an application onto virtual resources of a particular cluster on which the application components are to be executed. For example, the CADM can deploy application components of an application onto clients running in the respective cluster and datastores of the storage 104 on which the application components are to be executed. The CADM can deploy application components based on a number of parameters, which may include predefined rules and priorities. The CADM may be further configured to perform initial placement or deployment of clients in the host computers of the respective cluster based on predefined rules and priorities, as well as subsequent placement or migration of the existing clients in different host computers of the respective cluster. In some embodiments, the CADM is also configured to place tiles of clients being placed or migrated, such as virtual disk files and configuration files, to particular volumes and/or datastores in the storage 104. The CADM uses various policies or rules to place clients, including files of the clients, to particular host computers and datastores. Some of these placement rules may involve resource requirements of the clients, such as computing, memory, network and storage requirements. Some of these placement rules may also involve affinity or anti-affinity rules to selectively place clients in host computers and datastores, which may be mandatory (i.e., hard rules) or preferential (i.e., soft rules). Affinity rules may specify that clients should be placed in the same host computer or that files of the clients should be placed in the same datastore. Anti-affinity rules may specify that clients should not be placed in the same host computer or that files of the clients should not be placed in the same datastore. As an example, a client-client affinity rule ensures that all clients in a specified group will he placed on the same host computer. As another example, a client-client anti-affinity rule ensures that clients in a specified group will be placed on different host computers so that no two clients are placed on the same host computer. As another example, a client-host affinity rule ensures that specified clients are only placed in specified host computers. As another example, a client-host anti-affinity rule ensures that specified clients are never placed in any of specified host computers.

In some embodiments, each cluster management server 112 provides a user interface so that a user can input commands related to various aspects of cluster management. The user interface may be used to create storage profiles for clients running in the respective cluster. These storage profiles may list the storage capabilities that files of the clients, such as virtual disk file and configuration files, require to properly support the operation of the clients. The storage profile of a client is used by the CADM 116 to place the files of that client in appropriate datastore(s).

In some embodiments, the duster management servers 112 may be physical computers with each computer including at least memory and one or more processors, similar to the host computer 200. In other embodiments, the cluster management servers may be implemented as software programs running on physical computers, such as the host computer 200 shown in FIG. 2, or virtual computers, such as the VMs 220A, 220B . . . 220L.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. The storage may support taking "storage snapshot". Each storage snapshot provides a consistent view of the data content on the storage at a given point in time. In an embodiment, the storage can be accessed by entities, such as clients running on the host computers, using any file system, e.g., virtual machine file system (VMFS) or network file system (NFS). The storage includes one or more computer data storage devices 120, which can he any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage management module 118, which manages the operation of the storage. The storage management module can be used to deploy application components of an application onto virtual resources of the computer system 100 on which the application components are to be executed. For example, the storage management module can deploy application components of an application onto datastores and/or computer data storage devices of the storage on which the application components are to be executed. In an embodiment, the storage management module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the dusters. The same datastore may be associated with more than one cluster. For VMs, the datastores may be used to store virtual storage, e.g., virtual disks, used by each of the VMs, as well as other files needed to support the VMs, such as configuration files for the VMs. In addition, the datastores may he used to store snapshots of clients, e.g., VMs, which may include some or all of the files of the clients. One or more datastores may be associated with one or more host computers. Thus, each host computer is associated with at least one datastore. Some of the datastores may be grouped into one or more clusters of datastores, which are commonly referred to as storage pods.

The management computer 106 operates to manage the host computers H-1, H-2 . . . H-M of the clusters C-1, C-2 . . . C-N and/or the storage 104 of the computer system 100. The management computer may be configured to generate, modify and/or monitor the current configurations of the host computers and the clients running on the host computers, for example, VMs. The configurations may include hardware configuration of each of the host computers, such as CPU type and memory size, and/or software configurations of each of the host computers, such as operating system (OS) type and installed applications or software programs. The configurations may also include clustering information, i.e., which host computers are included in which clusters. The configurations may also include client hosting information, i.e., which clients, e.g., VMs, are hosted or running on which host computers. The configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients. In an embodiment, the management computer 106 may also be configured to generate, modify and/or monitor the current configuration of the storage 104, including the physical storage devices 120 and the datastores DS-1, DS-2 . . . DS-X of the storage.

In the embodiment depicted in FIG. 1, the application deployment module 108 is configured to deploy applications to the host computers H-1, H-2 . . . H-M in their respective clusters C-1, C-2 . . . C-N and the storage 104 according to the respective application topology. The application topology of an application, which is also referred to as the application architecture or the application blueprint of the application, contains information regarding virtual computing resources and application components of the application to be executed on the virtual computing resources. In some embodiments, an application is used to refer to a logical deployment unit, which is comprised of application packages and their dependent middleware and operating systems. For example, an application topology for an online store application may specify a web application, such as a Java web application, executing on an application server and using a database or a datastore. The online store application includes the application server and the database components, as well as the web application. In some embodiments, the application topology/architecture/blueprint models individual and clustered nodes (e.g., VMs), logical templates, cloud providers, deployment environments, software services, application-specific code, properties and/or dependencies between application components of an application. In an embodiment, the application topology of an application defines one or more dependencies between application components to indicate an installation order of the application components during the deployment of the application. The application topology of an application can be selected or assembled from a catalog, which includes a listing of available virtual computing resources (e.g., VMs, networking, and storage) that can be provisioned from the computer system 100 and available application components (e.g., software services, scripts, code components, and application-specific packages) that may be installed on the provisioned virtual computing, resources. In some embodiments, the application topology of an application can be selected or assembled from a catalog that is predefined and customized with specifications, configurations, properties, and other details for each item in the catalog.

In the embodiment depicted in FIG. 1, the application deployment module 108 automatically creates affinity-type rules fir various resources in the computer system 100. Affinity-type rules define how designated resources should be associated with each other. In general, affinity rules specify that designated resources should be connected to each other, while anti-affinity rules specify that designated resource should be disconnected from each other. The following are some common affinity-type rules for clients and host computers:

(1) Client-host affinity rules make a group of clients affine to a group of host computers. Under these rules, the clients in the group are only placed in one of the specified host computers, and are never moved to a host computer outside of this group of host computers.

(2) Client-host anti-affinity rules make a group of clients anti-affine to a group of host computers. Under these rules, the clients in the group are never placed in any of the host computers from the specified group.

(3) Client-client anti-affinity rules make a group of clients anti-affine to each other. Under these rules, no two clients in the specified group are placed in the same host computer.

(4) Client-client affinity rules make a group of clients affine to each other. Under these rules, the clients in the group are placed in the same host computer.

In some embodiments, a group of clients or host computers may include only a single client or a single host computer. These affinity and anti-affinity rules may be soft or hard. If an affinity-type rule is a hard rule, then that rule must be followed, which means that if an operation is not possible without breaking the hard rule, then the operation cannot proceed. If an affinity-type rule is a soft rule, that rule should be followed, which means that if an operation is not possible without breaking the soft rule, then the soft rule can be ignored and the operation is allowed to proceed without following the rule. Similar affinity-type rules can exist for other sources, such as storage and network resources.

In some embodiments, the application deployment module 108 generates affinity-type rules for resources without explicit specifications from an administrator to create the affinity-type rules. Explicit specifications may involve an administrator to a graphical user interface to select each of the resources being considered for a single affinity-type rule. The application deployment module can create affinity-type rules without having an administrator perform these manual operations to explicitly create affinity-type rules.

The application deployment setting storage 110 is configured to store the application deployment settings of the computer system 100. The application deployment setting storage can be an electronic, magnetic, optical, electromagnetic, infrared, or semiconductor system (or apparatus or device), or a propagation medium. Examples of the application deployment setting storage include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc. In some embodiments, the application deployment setting storage is a memory module, e.g., a random access memory (RAM), a read-only memory (ROM), or any other suitable memory, that can be used to store an application deployment setting. In one embodiment, the application deployment setting storage includes a cache component that caches an application deployment setting.

Figure 3:
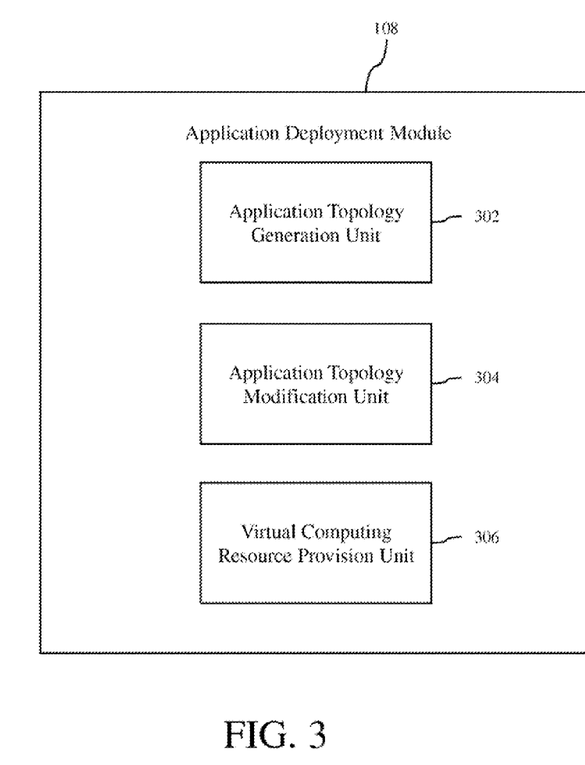
FIG. 3 is a block diagram of an application deployment module included in a management computer of the computer system depicted in FIG. 1 in accordance with an embodiment of the invention.

Turning now to FIG. 3, a block diagram of components of the application deployment module 108 in the management computer 106 in accordance with an embodiment of the invention is shown. As illustrated in FIG. 3, the application deployment module 108 includes an application topology generation unit 302, an application topology modification unit 304 and a virtual computing resource provision unit 306. These components of the application deployment module can be implemented as software, hardware or a combination of software and hardware. In other embodiments, the application deployment module may include other components found in conventional application deployment modules.

In an example operation of the application deployment module 108 depicted in FIG. 3, the application topology generation unit 302 obtains an application topology of virtual computing resources of the computer system and application components of an application to be executed on the virtual computing resources. The application topology modification unit 304 automatically extends the application topology to include one or more affinity-type rides for the virtual computing resources of the computer system based on at least one predefined policy of the application topology. The predefined policy or policies may contain information describing how different functional types of the virtual computing resources of the computer system are placed onto physical devices in the computer system. The virtual computing resource provision unit 306 deploys the application in the computer system by provisioning the virtual computing resources to the physical devices in the computer system based on the extended application topology. The virtual computing resources may include at least one of a virtual machine and a virtual storage device.

In some embodiments, the affinity-type rules for the virtual computing resources of the computer system 100 may include a virtual computing resource affinity rule that specifies virtual computing resources to be placed in the same host computer of the computer system, a virtual computing resource anti-affinity rule that specifies virtual computing resources to be placed in different host computers of the computer system, and/or a host-specific rule that specifies a virtual computing resource to be placed in or not to be placed in a particular host computer of the computer system.

In some embodiments, the application topology modification unit 304 is further configured to automatically create the affinity-type rules for the virtual computing resources of the computer system 100 based on resource allocation information of the virtual computing resources. In an embodiment, the application topology modification unit is further configured to automatically categorize resource usages of the virtual computing resources as low, medium or high, for a first virtual computing resource and a second virtual computing resource whose resource usages are automatically categorized as being high, create a virtual computing resource anti-affinity rule that specifies the first and second virtual computing resources to be placed in different host computers of the computer system, and automatically extend the application topology to include the virtual computing resource anti-affinity rule. The application topology modification unit may be further configured to automatically categorize virtual processor resource usages, virtual memory resource usages, virtual disk resource usages and virtual network resource usages of the virtual computing resources as low, medium or high. In another embodiment, the application topology modification unit is further configured to determine that a first virtual computing resource and a second virtual computing resource require the same software license to operate and create a virtual computing resource affinity rule that specifies the first and second virtual computing resources to be placed in the same host computer of the computer system that has the software license.

In some embodiments, the predefined policy used by the application topology modification unit 304 contains information describing that virtual, computing resources performing a first function and virtual computing resources performing second function are to be placed on separate host computers of the computer system. For example, the predefined policy may contain information, which describes a load-balancing VM is to be placed on a separate host computer from a web server VM. In this embodiment, the application topology modification unit is further configured to determine that a first virtual computing resource performs the first function and that a second virtual computing resource performs the second function, create a virtual computing resource anti-affinity rule that specifies the first and second virtual computing resources to be placed in different host computers of the computer system, and automatically extend the application topology to include the virtual computing resource anti-affinity Rile.

In some embodiments, the application topology modification unit 304 generates affinity-type rules using resource association inferences without human intervention with respect to the generation of the inference information and the generation of the affinity-type rules. However, in some cases, inference information may be manually provided by an administrator via a user interface. When association inference information for a resource is received, the application deployment module analyzes the information and determines any resource association between that resource and any other resource or resources in the computer system 100. There is various information that can indicate resource associations to automatically generate affinity-type rules. As an example, operational characteristics of a new client being placed, e.g., latency sensitivity of a VM, may be used to infer association of the client to one or more host computers. As another example, the physical location of a host computer into which a new client is being placed may be used to infer association of the client, to that physical location. The type of information used to create affinity-type rules can vary depending on different use scenarios.

The application deployment module 108 may be configurable to recognize select use scenarios so that an administrator can control the affinity-type rules that are automatically created, as well as the type of information being used to create those rules. Some of these use scenarios that can be recognized by the application deployment module will be described below.

In a first use scenario, the application topology generation unit 302 obtains an application topology/blueprint of a 3-tier web service application with the following constituents:
VM1: 1 load balancer VM (e.g., implemented as an Apache server),
VM2 and VM3: web server VMs (e.g., implemented as Tomcat server), and
VM4: database (e.g., implemented as a postgres database).

In this first use scenario, the application topology modification unit 304 extends the application topology/blueprint of the 3-tier web service application to include an affinity-type rule for the virtual machines, VM1, VM2, VM3 and VM4, as described below. For each of the virtual machines, VM1, VM2, VM3 and VM4, the application topology modification unit sets the expected resource usage as shown in Table-1 by over-writing the default settings for the 3-tier web service application.

| VM | CPU usage | Memory usage | Disk I/O | Network I/O |
|---|---|---|---|---|
| VM1 | Low | Low | Low | High |
| VM2 | High | High | Low | Medium |
| VM3 | High | High | Low | Medium |
| VM4 | High | Medium | High | Medium |

Expected CPU usage, expected memory usage, expected disk I/O usage and expected network bandwidth usage are categorized in three levels, Low, Medium, and High. The level of the expected usage of a certain resource can be determined by comparing the expected usage with a first threshold and a second threshold that is higher than the first threshold. If the expected usage is higher than the second threshold, the expected usage is determined as being high. If the expected usage is higher than the first, threshold and lower than the second threshold, the expected usage is determined as being medium. If the expected usage is lower than the first threshold, the expected usage is determined as being low. Based on the expected resource usages of the virtual machines, VM1, VM2, VM3 and VM4, the application topology modification unit 304 defines the affinity rules for the virtual machines, VM1, VM2, VM3 and VM4, as:
  i. Affinity groups: {(VM1,VM4)}, which means that VM1 and VM4 can be placed on the same physical host because the CPU, memory and disk I/O usages of VM1 are low.
  ii. Anti-affinity groups: {VM2,VM3)}, which means that VM2 and VM3 cannot be placed on the same physical host because the CPU and memory usages of VM2 and VM3 are both high.

In some embodiments, a user sets a policy during application topology/blueprint creation with an anti-affinity rule describing that instances of web server VMs (e.g., VM2, VM3 in the first use scenario) should not be placed on the same physical host. In some embodiments, a user also sets a policy during, application topology/blueprint creation with an affinity rule describing that instances of load balancer and database VMs (e.g., VM1, VM4 in the first use scenario) should be placed on the same physical host.

In the first use scenario, the virtual computing resource provision unit 306 deploys the 3-tier web service application in the computer system 100 by provisioning the virtual machines, VM1, VM2, VM3 and VM4, to the physical devices in the computer system based on the extended application topology/blueprint from the application topology modification unit 304. The virtual computing resource provision unit can define VM-host affinity rules during provisioning time. For example, if a physical server (H-1) is used to cater to all database VMs, an affinity rule (H1, VM4) can be set. During runtime, resource allocation software, such as a VMware vSphere® Distributed Resource Scheduler™ (DRS) installed in a VMware Center™ server, can give precedence to the expected resource usage according to the extended application topology/blueprint rather than determining on the fly by metering, the virtual machines, VM1, VM2, VM3 and VM4.

In a second use scenario, VM placement is performed based on licensing (guest OS/applications) costs. In the second use scenario, the application topology generation unit 302 obtains an application topology/blueprint of a n-tier application with the following constituents:
VM1: Linux
VM2: Windows Server
VM3: Windows Server
VM4: Linux, The n-tier application will be implemented in a cluster of three host computers, HOST1, HOST2 and HOST3. Out of the three host computers, all CPU cores on HOST2 are licensed to run Windows Server OS.

In the second use scenario, the application topology modification unit 304 extends the application topology/blueprint of the n-tier application to include an affinity-type rule for the virtual machines, VM1, VM2, VM3 and VM4, for optimizing license cost. Because the virtual machines, VM2, VM3, run on windows operation system, the application topology modification unit defines the affinity rules for the virtual machines, VM1, VM2, VM3 and VM4, as:

Affinity groups: {(VM2, VM3)}, to reduce licensing cost.

In a third use scenario, the application deployment module 108 deals with the 3-tier web service application in the first use scenario. However, the application topology modification unit 304 extends the application topology/blueprint of the 3-tier web service application based on a security policy, which states "the load balancer must be running on the same host server as that of firewall and all other tiers should not be provisioning on the same host server as that of load balancer." This policy will be translated into anti-affinity rules as VM2, VM3 and VM4 with respect to VM1. In particular, the application topology modification unit 304 defines the affinity rules for the virtual machines, VM1, VM2, VM3 and VM4 as:

Anti-affinity groups: {(VM1, VM2), (VM1, VM3), (VM1, VM4)}, which means that VM1 can be placed in the same host as VM2, VM3 and VM4.

Figure 4:
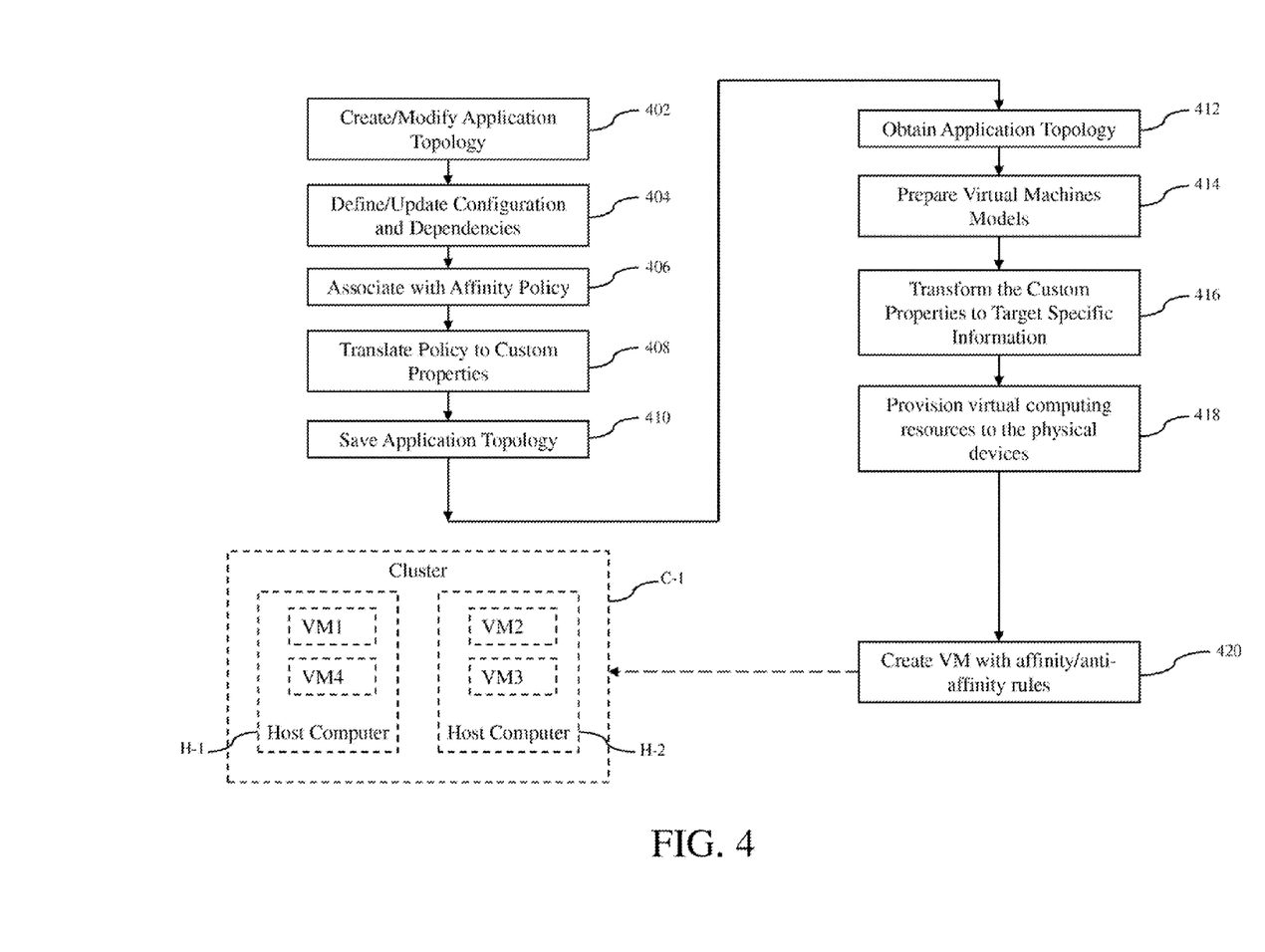
FIG. 4 is a flow chart that illustrates an exemplary operation of the application deployment module depicted in FIG. 3.

FIG. 4 is a flow chart that illustrates an exemplary operation of the application deployment module 108 depicted in FIG. 3. In the exemplary operation, an application topology/blueprint of virtual computing resources of the computer system 100 and application components of an application to be executed on the virtual computing resources is extended to include an affinity-type rule for the virtual computing resources of the computer and the application is deployed in the computer system by provisioning the virtual computing resources to the physical devices in the computer system based on the extended application topology.

In the application deployment operation depicted in FIG. 4, steps 402-410 are performed by the application topology generation unit 302 and the application topology modification unit 304 of the application deployment module 108. At step 402, an application topology/blueprint is created from blank or modified based on a template application topology/blueprint. At step 404, configuration and dependencies of virtual resources of the computer system 100 are newly defined or updated based on existing configuration and dependencies. At step 406, the application topology/blueprint is extended to associate with affinity policy regarding virtual resources of the computer system, e.g., as described previously with respect to FIG. 3. At step 408, the affinity policy is translated into custom properties of the virtual resources of the computer system. At step 410, the application topology/blueprint is saved.

Steps 412-418 are performed by the virtual computing resource provision unit 306 of the application deployment module 108. At step 412, the application topology/blueprint is obtained from the application topology modification unit 304. At step 414, models of the virtual machines are prepared. At step 416, the custom properties of the application topology/blueprint are transformed into specific configuration information of virtual resources of the computer system 100. At step 418, the virtual computing resources of the computer system are provisioned to the physical devices in the computer system based on the application topology/blueprint.

Step 420 is performed in a virtual infrastructure server VMware vCenter™). At step 420, virtual machines are created on host computers based on affinity/anti-affinity rules of the application topology/blueprint. For example, a computer cluster C-1 is formed with host computers H-1, H-2. Four VMs, VM1, VM2, VM3, VM4, are created or placed on the host computers H-1, H-2 based on affinity/anti-affinity rules of the application topology/blueprint. For example, the affinity/anti-affinity rules create affinity groups: {(VM1, VM4)}, {(VM2, VM3)}, which means that VM1 and VM4 can be placed on the same physical host and that VM2 and VM3 can be placed on the same physical host. The affinity/anti-affinity rules also create two anti-affinity groups: {VM1, VM2)}, {VM3, VM4)}, which means that VM1 and VM2 cannot be placed on the same physical host and that that VM3 and VM4 cannot be placed on the same physical host. According to the affinity groups and anti-affinity groups, two VMs, VM1, VM4, are placed on the host computer H-1 while two VMs, VM2, VM3, are placed on the host computer H-2.

In summary, the application deployment module 108 deploys application services based on application topologies/blueprints and automatically places different functional types of virtual computing resources of the computer system 100 onto physical devices in the computer system 100 according to predefined affinity-type rules. Compared to conventional virtualized infrastructures in which affinity-type rules are manually created by an administrator to specify the placement of virtual computer sources onto host computers, the application deployment module can improve the application deployment efficiency of the computer system and reduce operational costs of the computer system.

Figure 5:
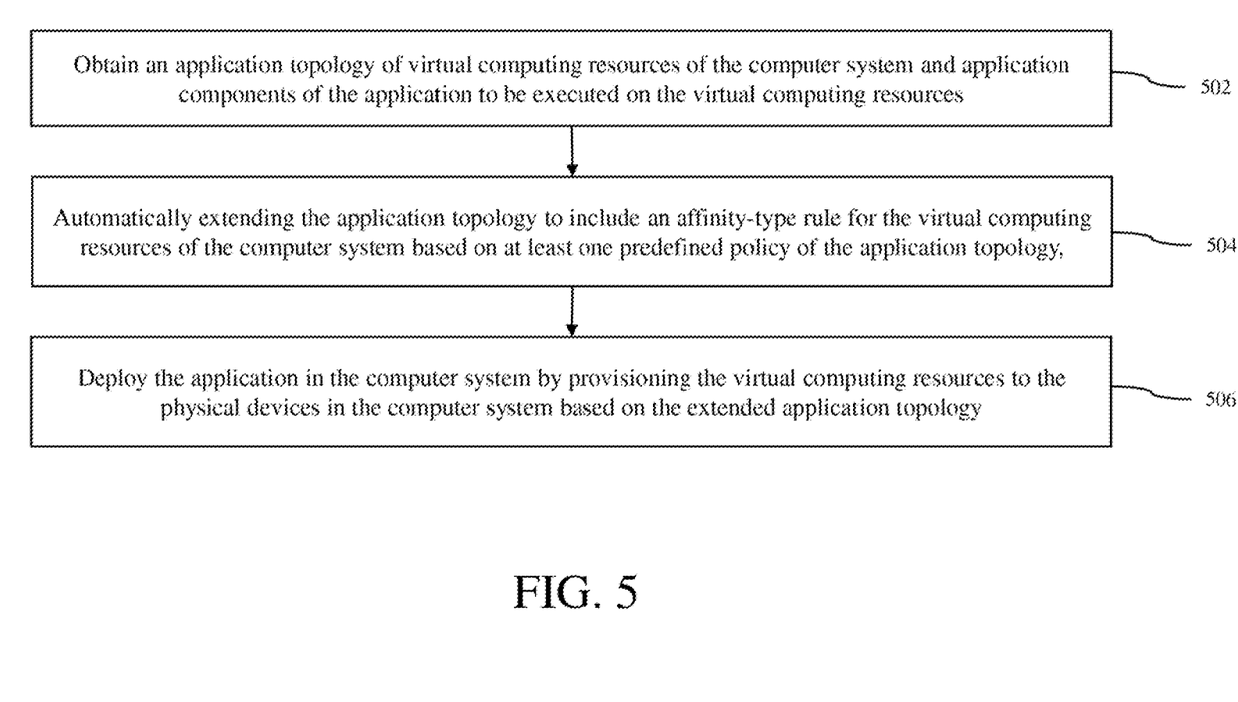
FIG. 5 is a flow diagram of a method for deploying an application in a computer system in accordance with an embodiment of the invention.

A method for deploying an application in a computer system in accordance with an embodiment of the invention is described with reference to a flow diagram of FIG. 5. At block 502, an application topology of virtual computing resources of the computer system and application components of the application to be executed on the virtual computing resources is obtained. At block 504, the application topology is automatically extended to include an affinity-type rule for the virtual computing resources of the computer system based on at least one predefined policy of the application topology, where the at least one predefined policy contains information describing how different functional types of the virtual computing resources of the computer system are to be placed onto physical devices in the computer system. At block 506, the application is deployed in the computer system by provisioning the virtual computing resources to the physical devices in the computer system based on the extended application topology.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner, It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of deploying an application in a computer system, the method comprising:
    obtaining an application topology of virtual computing resources of the computer system and application components of the application to be executed on the virtual computing resources;
    automatically extending the application topology to include an affinity-type rule for the virtual computing resources of the computer system based on at least one predefined policy of the application topology, wherein the at least one predefined policy contains information describing how different functional types of the virtual computing resources of the computer system are to be placed onto physical devices in the computer system, and wherein automatically extending the application topology to include the affinity-type rule for the virtual computing resources of the computer system comprises:
        automatically categorizing a resource usage of each of the virtual computing resources as high if the resource usage is higher than a corresponding threshold;
        for a first virtual computing resource whose resource usage is automatically categorized as being high and a second virtual computing resource whose resource usage is also automatically categorized as being high, creating a virtual computing resource anti-affinity rule that specifies the first and second virtual computing resources to be placed in different host computers of the computer system; and
        automatically extending the application topology to include the virtual computing resource anti-affinity rule; and
    deploying the application in the computer system by provisioning the virtual computing resources to the physical devices in the computer system based on the extended application topology.

2. The method of claim 1, wherein the virtual computing resources comprise at least one of a virtual machine and a virtual storage device.

3. The method of claim 1, wherein automatically extending the application topology to include the affinity-type rule for the virtual computing resources of the computer system comprises automatically creating the affinity-type rule for the virtual computing resources of the computer system based on resource allocation information of the virtual computing resources or user input.

4. The method of claim 1, wherein the affinity-type rule for the virtual computing resources of the computer system comprises a virtual computing resource affinity rule that specifies a plurality of virtual computing resources to be placed in the same host computer of the computer system.

5. The method of claim 1, wherein the affinity-type rule for the virtual computing resources of the computer system comprises a virtual computing resource anti-affinity rule that specifies a plurality of virtual computing resources to be placed in different host computers of the computer system.

6. The method of claim 1, wherein the affinity-type rule for the virtual computing resources of the computer system comprises a host-specific rule that specifies a virtual computing resource to be placed in or not to be placed in a particular host computer of the computer system.

7. The method of claim 1, wherein automatically categorizing the resource usage of each of the virtual computing resources as high comprises automatically categorizing a virtual processor resource usage, a virtual memory resource usage, a virtual disk resource usage and a virtual network resource usage of each of the virtual computing resources as high if the virtual processor resource usage, the virtual memory resource usage, the virtual disk resource usage and the virtual network resource usage are higher than corresponding processor, memory, disk and network usage thresholds, respectively.

8. The method of claim 1, wherein automatically extending the application topology to include the affinity-type rule for the virtual computing resources of the computer system comprises:
    determining that a first virtual computing resource and a second virtual computing resource requires the same software license to operate; and
    creating a virtual computing resource affinity rule that specifies the first and second virtual computing resources to be placed in the same host computer of the computer system that has the software license.

9. The method of claim 1, wherein the at least one predefined policy contains information describing that virtual computing resources performing a first function and virtual computing resources performing a second function are to be placed on separate host computers of the computer system, wherein automatically extending the application topology to include the affinity-type rule for the virtual computing resources of the computer system comprises:
    determining that a first virtual computing resource performs the first function and that a second virtual computing resource performs the second function, wherein the first function is different from the second function;

creating a virtual computing resource anti-affinity rule that specifies the first and second virtual computing resources to be placed in different host computers of the computer system; and
automatically extending the application topology to include the virtual computing resource anti-affinity rule.

10. A non-transitory computer-readable storage medium containing program instructions for deploying an application in a computer system, wherein execution of the program instructions by one or more processors causes the one or more processors to perform steps comprising:
obtaining an application topology of virtual computing resources of the computer system and application components of the application to be executed on the virtual computing resources;
automatically extending the application topology to include an affinity-type rule for the virtual computing resources of the computer system based on at least one predefined policy of the application topology, wherein the at least one predefined policy contains information describing how different functional types of the virtual computing resources of the computer system are to be placed onto physical devices in the computer system, and wherein automatically extending the application topology to include the affinity-type rule for the virtual computing resources of the computer system comprises:
automatically categorizing a resource usage of each of the virtual computing resources as high if the resource usage is higher than a corresponding threshold;
for a first virtual computing resource whose resource usage is automatically categorized as being high and a second virtual computing resource whose resource usage is also automatically categorized as being high, creating a virtual computing resource anti-affinity rule that specifies the first and second virtual computing resources to be placed in different host computers of the computer system; and
automatically extending the application topology to include the virtual computing resource anti-affinity rule; and
deploying the application in the computer system by provisioning the virtual computing resources to the physical devices in the computer system based on the extended application topology.

11. The non-transitory computer-readable storage medium of claim 10, wherein the virtual computing resources comprise at least one of a virtual machine and a virtual storage device.

12. The non-transitory computer-readable storage medium of claim 10, wherein automatically extending the application topology to include the affinity-type rule for the virtual computing resources of the computer system comprises automatically creating the affinity-type rule for the virtual computing resources of the computer system based on resource allocation information of the virtual computing resources or user input.

13. The non-transitory computer-readable storage medium of claim 10, wherein the affinity-type rule for the virtual computing resources of the computer system comprises a virtual computing resource affinity rule that specifies a plurality of virtual computing resources to be placed in the same host computer of the computer system.

14. The non-transitory computer-readable storage medium of claim 10, wherein the affinity-type rule for the virtual computing resources of the computer system comprises a virtual computing resource anti-affinity rule that specifies a plurality of virtual computing resources to be placed in different host computers of the computer system.

15. The non-transitory computer-readable storage medium of claim 10, wherein the affinity-type rule for the virtual computing resources of the computer system comprises a host-specific rule that specifies a virtual computing resource to be placed in or not to be placed in a particular host computer of the computer system.

16. The non-transitory computer-readable storage medium of claim 10, wherein automatically categorizing the resource usage of each of the virtual computing resources as high comprises automatically categorizing a virtual processor resource usage, a virtual memory resource usage, a virtual disk resource usage and a virtual network resource usage of each of the virtual computing resources as high if the virtual processor resource usage, the virtual memory resource usage, the virtual disk resource usage and the virtual network resource usage are higher than corresponding processor, memory, disk and network usage thresholds, respectively.

17. The non-transitory computer-readable storage medium of claim 10, wherein automatically extending the application topology to include the affinity-type rule for the virtual computing resources of the computer system comprises:
determining that a first virtual computing resource and a second virtual computing resource requires the same software license to operate; and
creating a virtual computing resource affinity rule that specifies the first and second virtual computing resources to be placed in the same host computer of the computer system that has the software license.

18. The non-transitory computer-readable storage medium of claim 10, wherein the at least one predefined policy contains information describing that virtual computing resources performing a first function and virtual computing resources performing a second function are to be placed on separate host computers of the computer system, wherein automatically extending the application topology to include the affinity-type rule for the virtual computing resources of the computer system comprises:
determining that a first virtual computing resource performs the first function and that a second virtual computing resource performs the second function, wherein the first function is different from the second function;
creating a virtual computing resource anti-affinity rule that specifies the first and second virtual computing resources to be placed in different host computers of the computer system; and
automatically extending the application topology to include the virtual computing resource anti-affinity rule.

19. A system for deploying an application in a computer system, the system comprising:
an application topology generation unit configured to obtain an application topology of virtual computing resources of the computer system and application components of the application to be executed on the virtual computing resources;
an application topology modification unit configured to automatically extend the application topology to include an affinity-type rule for the virtual computing resources of the computer system based on at least one predefined policy of the application topology, wherein the at least one predefined policy contains information describing how different functional types of the virtual computing resources of the computer system are to be placed onto physical devices in the computer system, and wherein the application topology modification unit is further configured to:
  automatically categorize a resource usage of each of the virtual computing resources as high if the resource usage is higher than a corresponding threshold;
  for a first virtual computing resource whose resource usage is automatically categorized as being high and a second virtual computing resource whose resource usage is also automatically categorized as being high, create a virtual computing resource anti-affinity rule that specifies the first and second virtual computing resources to be placed in different host computers of the computer system; and
  automatically extend the application topology to include the virtual computing resource anti-affinity rule; and
a virtual computing resource provision unit configured to deploy the application in the computer system by provisioning the virtual computing resources to the physical devices in the computer system based on the extended application topology,
wherein the application topology generation unit, the application topology modification unit and the virtual computing resource provision unit are implemented using a processor.

20. The system of claim 19, wherein the virtual computing resources comprise at least one of a virtual machine and a virtual storage device.

21. The system of claim 19, wherein the application topology modification unit is further configured to automatically create the affinity-type rule for the virtual computing resources of the computer system based on resource allocation information of the virtual computing resources or user input.

22. The system of claim 19, wherein the affinity-type rule for the virtual computing resources of the computer system comprises a virtual computing resource affinity rule that specifies a plurality of virtual computing resources to be placed in the same host computer of the computer system.

23. The system of claim 19, wherein the affinity-type rule for the virtual computing resources of the computer system comprises a virtual computing resource anti-affinity rule that specifies a plurality of virtual computing resources to be placed in different host computers of the computer system.

24. The system of claim 19, wherein the affinity-type rule for the virtual computing resources of the computer system comprises a host-specific rule that specifies a virtual computing resource to be placed in or not to be placed in a particular host computer of the computer system.

25. The system of claim 19, wherein the application topology modification unit is further configured to automatically categorize a virtual processor resource usage, a virtual memory resource usage, a virtual disk resource usage and a virtual network resource usage of the virtual computing resources as high if the virtual processor resource usage, the virtual memory resource usage, the virtual disk resource usage and the virtual network resource usage are higher than corresponding processor, memory, disk and network usage thresholds, respectively.

26. The system of claim 19, wherein the application topology modification unit is further configured to:
  determine that a first virtual computing resource and a second virtual computing resource requires the same software license to operate; and
  create a virtual computing resource affinity rule that specifies the first and second virtual computing resources to be placed in the same host computer of the computer system that has the software license.

27. The system of claim 19, wherein the at least one predefined policy contains information describing that virtual computing resources performing a first function and virtual computing resources performing a second function are to be placed on separate host computers of the computer system, wherein the application topology modification unit is further configured to:
  determine that a first virtual computing resource performs the first function and that a second virtual computing resource performs the second function, wherein the first function is different from the second function;
  create a virtual computing resource anti-affinity rule that specifies the first and second virtual computing resources to be placed in different host computers of the computer system; and
  automatically extend the application topology to include the virtual computing resource anti-affinity rule.

* * * * *